United States Patent [19]
Dreyer

[11] Patent Number: 5,333,489
[45] Date of Patent: Aug. 2, 1994

[54] CIRCUIT ARRANGEMENT TO DETECT KNOCKING

[75] Inventor: Adolf Dreyer, Hemmingen, Fed. Rep. of Germany

[73] Assignee: Robert Bosch GmbH, Stuttgart, Fed. Rep. of Germany

[21] Appl. No.: 768,895

[22] PCT Filed: Feb. 28, 1991

[86] PCT No.: PCT/DE91/00171
§ 371 Date: Oct. 18, 1991
§ 102(e) Date: Oct. 18, 1991

[87] PCT Pub. No.: WO91/14163
PCT Pub. Date: Sep. 19, 1991

[30] Foreign Application Priority Data

Mar. 15, 1990 [DE] Fed. Rep. of Germany ....... 4008284

[51] Int. Cl.⁵ .............................................. G01L 23/22
[52] U.S. Cl. .............................................. 73/35
[58] Field of Search .............................................. 73/35

[56] References Cited
U.S. PATENT DOCUMENTS
3,393,557  7/1968  Brown et al. .............................. 73/35

FOREIGN PATENT DOCUMENTS
175915  4/1986  European Pat. Off.
57-175938  10/1982  Japan.

Primary Examiner—John E. Chapman
Attorney, Agent, or Firm—Michael J. Striker

[57] ABSTRACT

The circuit arrangement for detecting and evaluating knocking in an internal combustion engine includes a knock sensor located in the internal combustion engine to generate a knock sensor signal having knock signal frequency components of differing knock signal frequencies; an oscillator producing a constant frequency oscillator signal; a mixer stage producing a mixed signal including mixed signal frequency components of various mixed signal frequencies which are less than the corresponding knock signal frequencies of the knock sensor signal, the mixer stage being connected to receive the constant frequency oscillator signal and the knock sensor signal; a level stabilizing circuit for adjusting an amplitude of the knock sensor signal to a constant amplitude level despite changes in an operating state of the internal combustion engine, the level stabilizing circuit connecting the knock sensor and the mixer stage; a filter circuit connected to the mixer stage to filter the mixed signal and form a filtered mixed signal including filtered mixed signal components at the mixed signal frequencies; and an evaluating circuit connected to the filter circuit for analysis of the filtered mixed signal.

21 Claims, 7 Drawing Sheets

CIRCUIT ARRANGEMENT TO DETECT KNOCKING

BACKGROUND OF THE INVENTION

The invention is related to a circuit arrangement to detect knocking in an internal combustion engine, and particularly, to a circuit arrangement having a knock sensor which is connected with an evaluating circuit via a filter effecting a separation of the knock frequency.

In automotive engineering, knocking in an internal combustion engine is a dangerous operating state which can lead to damage in the long run. Therefore, circuit arrangements to detect knocking in an internal combustion engine are known which determine the frequency spectrum of the internal combustion engine by means of a knock sensor and, after filtering out the relevant knock frequency, feed it to a circuit arrangement which, when knocking is detected, changes the operating parameters of the internal combustion engine in such a way that knock-proof operation is brought about. Increasingly greater demands are made with respect to the detecting and evaluating devices of the known circuit arrangements. For example, increasingly higher knock frequencies must be determined and evaluated as a result of modern internal combustion engine construction. This conflicts with the relatively low limit frequencies of the evaluating circuits presently in use. In addition, there is a demand for arrangements for evaluating the knock sensor signals which are constructed in a particularly simple manner.

SUMMARY OF THE INVENTION

In contrast to the known circuit arrangements, the circuit arrangement according to the invention has the advantage that a simple and accordingly inexpensive construction of the entire circuit arrangement is possible in spite of the relatively high frequency of the knock sensor signal, since a frequency reduction is effected so that a relatively simple technique can be used. According to the invention, the reduction in frequency is effected with a means for superposing which works according to the principle of superposition (beat principle, superheterodyne principle) and accordingly lowers the frequencies of the knock sensor signal components. This reduced frequency mixed signal is then fed to the evaluating circuit via filter means.

According to a further development of the invention, the means for superposing receives another signal at an oscillator frequency of the same magnitude as the predominant knock frequency for mixing or superposition with the knock sensor signal. The advantage of this consists in that a mixed signal is available at the output of the superposing means which corresponds to the envelope curve of the knock signal.

It is also possible to operate the superposing means with an oscillator frequency which diverges from the knock sensor signal frequencies in such a way that the mixed signal frequencies of the output signal of the mixer stage is less than the sensor signal frequencies. This frequencies reduction then enables a further processing of the signal using simple means. The oscillator frequency can be below or above the frequency of the anticipated knock signal by an amount corresponding to the desired filter frequency of a subsequently arranged filter means (band-pass filter). As has already been mentioned, the advantage of this signal processing consists in that knock signals of very high frequencies can be processed, wherein no special demands are to be made on the further signal processing with respect to the frequency processing characteristics.

The means for superposing comprises a mixer stage multiplier. The knock sensor signal, which is composed of ground noise and possible knock signals, and the oscillator frequency—as additional input quantity—are fed to this mixer stage multiplier. The output of the multiplier is connected to the evaluating circuit.

In particular, a level stabilizing circuit can be connected between the superposition means and the knock sensor. This ensures that the knock sensor signal, whose amplitude depends on the operating state of the internal combustion engine, is brought to a constant level and then subjected to further processing. Fluctuations in amplitude of the knock sensor signal are, e.g. speed-related and are also dependent on the operating hours of the internal combustion engine (aging). These fluctuations are caused by the spread and tolerances of the component elements.

According to a preferred embodiment of the invention, the level stabilizing circuit comprises a stabilizer circuit multiplier which receives the knock sensor signal and a regulating signal of the evaluating circuit as input quantities. The regulating signal is supplied by a regulator circuit which makes up part of the evaluating circuit. Accordingly, a constant level is always ensured at the output of the level stabilizing circuit as a result of the regulator circuit.

In particular, it can be provided that the evaluating circuit is constructed as a microcomputer. This can be e.g. part of a control device of the internal combustion engine.

The regulator circuit of the microcomputer is preferably connected to the level stabilizing circuit via an averaging means. This averaging element is required for obtaining a direct voltage component from the logical signal originating from the microcomputer, which signal is particularly a pulse-width modulated signal, preferably a pulse-width modulated square wave signal. This is effected by finding the mean value of the pulse-width modulated signal. The averaging means is preferably formed by an RC network.

The filter means mentioned in the beginning, which filters the relevant knock frequency out of the knock sensor signal is constructed, according to the invention as a low-pass filter.

This advantage of the construction according to the invention is that the band-pass filter (knock filter) known from the prior art can be dispensed with. Moreover, a very simple low-pass filter, preferably of the first order, is sufficient for the signal filtering. This is the case particularly when—as was previously the case—a knock filter of only very low quality (e.g. Q=3) is used. Accordingly, the arrangement of the invention also provides a particularly simple applicability: instead of adjusting the knock filter mean frequency (band-pass filter) and the knock filter quality, as was previously the case, the parameters for the oscillator signal and the low-pass cut-off frequency can be determined, according to the invention, in a simple manner. The latter can be adjusted in a simple manner and without feedback, for example, by means of a trimmer. The low-pass filter, according to the invention, eliminates high-frequency unwanted mixing products.

According to a preferred embodiment of the invention, the low-pass filter is formed by an RC network.

OTA components (operational transconductance amplifiers) are preferably used as mixer stage and stabilizing circuit multipliers.

In the previously described construction variants, it is possible that there will be no synchronism between the oscillator signal and the knock signal. As a result of this absence of synchronism, a generation not only of the envelope curve of the knock signal alone, but also of a beat frequency, is effected. Consequently, there is no distortion-free demodulation, although this is not essential, since the level is utilized for detecting a knocking state. However, the beat frequency can also result in a "zero" value and consequently, in the impossibility of detecting knocking. However, this beat frequency can also be avoided when the knock signal is fed to two mixer stages which are operated at the same oscillator frequencies having different relative phases. Accordingly, it is always ensured that any knocking taking place is detected and the corresponding countermeasures can be taken. In particular, the phase angle difference is 90°.

Two clock signals which are out of phase by 90° can be assigned to the two oscillator frequencies; that is, these clock signals can be the other signals which are mixed with the knock sensor signal and which have the aforementioned oscillator frequencies. In particular, it is advantageous if the clock signals are supplied by the aforementioned microcomputer. This is then a matter of logic signals. The microcomputer accordingly supplies the two clock signals which are out of phase by 90° relative to one another.

However, as an alternative to this, it is also possible to form the clock signals from a time base signal of double the frequency by two frequency divider means. One frequency divider means is triggered by the positive flank and the other is triggered by the negative flank of the time base signal. The two clock signals which are out of phase by 90° relative to one another are accordingly obtained from the base clock signal by means of this different triggering of the frequency divider means.

Further, it is possible to connect the outputs of the two multipliers to a low-pass filter in each instance and to combine the low-pass filter outputs by means of a combinatorial circuit. The combinatorial circuit is preferably constructed as a summing or connection point. Consequently, two multipliers and two low-pass filters are required. A common signal is first formed again from the output signals of the two low-pass filters by the combinatorial circuit, which common signal is then subjected to further processing. Alternatively, the outputs of the two multipliers, each of which receives the signal formed by the level stabilizing circuit, are combined by means of the combinatorial circuit and the output of the combinatorial circuit leads to a low-pass filter. To this extent, only one low-pass filter is necessary in this case, instead of the aforementioned two low-pass filters.

The computing cost of the evaluating circuit can be reduced when a threshold switch is connected between the low-pass filter and the evaluating circuit. The threshold switch registers whether or not the level is exceeded by a set value. This task need no longer be carried out by an analog-to-digital converter with a stored comparison value, so that the computing load is smaller. For an accurate knocking effect, it is then only necessary for the computer to determine the sum of times the level is exceeded per unit of time and accordingly, to enable an accurate detection of a knocking state. The computer then need no longer carry out a comparison with a set value, etc.

Alternatively, it is also possible to connect a rectifier and a subsequent integrator between the low-pass filter and the evaluating circuit instead of the threshold switch. Accordingly, the computing expenditure for the microcomputer is still further reduced; a kind of evaluation utilizing hardware is effected for the most part. The rectifier is required for ensuring that the integrator does not "integrate down" further when there are negative signals. The microcomputer, which is connected to the output of the integrator, need only decide whether or not the integration value exceeds a set value. If the set value is exceeded, a knocking state exists. The operation of the microcomputer can therefore be compared with that of a comparator.

The present invention both as to its construction so to its mode of operation, together with additional objects and advantages thereof, will be best understood from the following description of preferred embodiments when read with reference to the accompanying drawings.

DETAILED DESCRIPTION OF THE PREFERRED EMBODIMENTS

Figure 1:
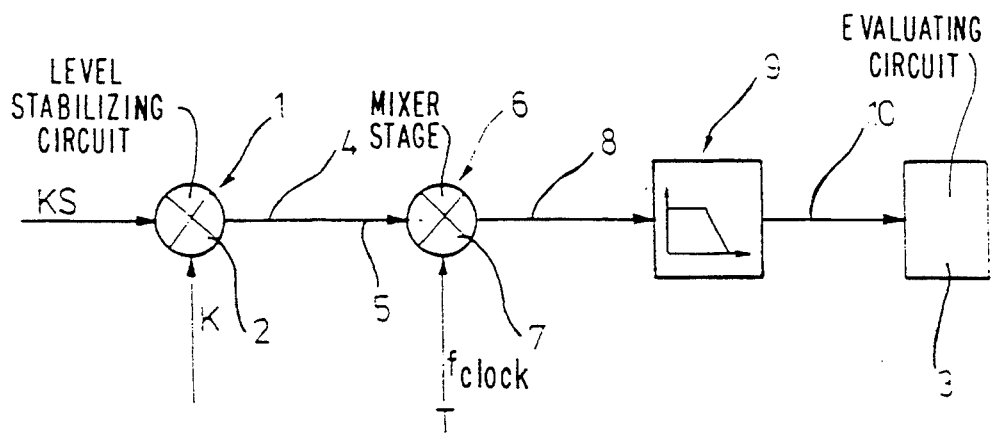
FIG. 1 shows a schematic first embodiment of a circuit arrangement according to the invention for detecting knocking in an internal combustion engine.

FIG. 1 shows a basic circuit diagram of one embodiment of the circuit arrangement according to the invention. This circuit arrangement serves to detect knocking in an internal combustion engine. It comprises a knock sensor (not shown) having a knock sensor signal KS fed to a level stabilizing circuit 1. The level stabilizing circuit 1 is constructed as a multiplier 2. The latter receives a regulating signal K as additional input quantity. The regulating signal K is supplied by an evaluating circuit 3. This will be discussed in more detail in the following.

The output 4 of the multiplier 2 is connected with an input 5 of a mixer stage 6. The mixer stage 6 is likewise constructed as a multiplier 7. To this extent, the multiplier 7 is a mixer stage multiplier and the multiplier 2 is a stabilizer stage multiplier.

The mixer stage multiplier 7 receives an oscillator frequency $f_{clock}$ of a clock signal T as additional input quantity. The following relationship applies to the clock signal T:

$$\hat{U}\sin\omega_K t$$

where $$\omega_K = 2\pi f_{knock}.$$

Like the regulating signal K, the clock signal T originates from the evaluating circuit 3. The mixer stage 6 is a means for superimposing or mixing a leveled knock signal KS having a knock signal frequency with another signal having the oscillator frequency $f_{clock}$.

The output 8 of the mixer stage 6 is connected with a filter 9 which is constructed as a low-pass filter TP. It is preferably a low-pass filter of the first order, which can be realized in a simple manner by an RC network. The output 10 of the filter 9 leads to the evaluating circuit 3.

The arrangement is constructed in such a way that a substantially constant level is generated at the stabilizer stage multiplier 2 by means of the regulating signal K at the output 4. This means that the knock sensor signal KS, whose amplitude fluctuates as a result of the different operating states of the internal combustion engine, etc., is regulated at a constant level. The output signal of the stabilizer stage multiplier 2 then reaches the mixer stage multiplier 7 which forms the mixer stage 6 and therefore carries out a superposition with the clock signal T according to the superposition principle (superheterodyne principle). The frequency (oscillator frequency $f_{clock}$) of the clock signal T is selected so as to be just as great as the anticipated knock frequency $f_{knock}$ of the internal combustion engine. The mixed signal thus obtained contains, among other things, the information characterizing the knocking state and in this instance has a mixed signal frequency in an audio-frequency range. A signal is obtained which corresponds to the envelope curve of the knock signal. This can be further processed using simple means. The mixed output signal of the mixer stage 6 is directed via the low-pass filter TP9 in order to eliminate high-frequency unwanted mix products. The signal originating from the filter 9 is then evaluated in the subsequent evaluating circuit 3 with respect to a possible knocking state of the internal combustion engine.

Figure 2:
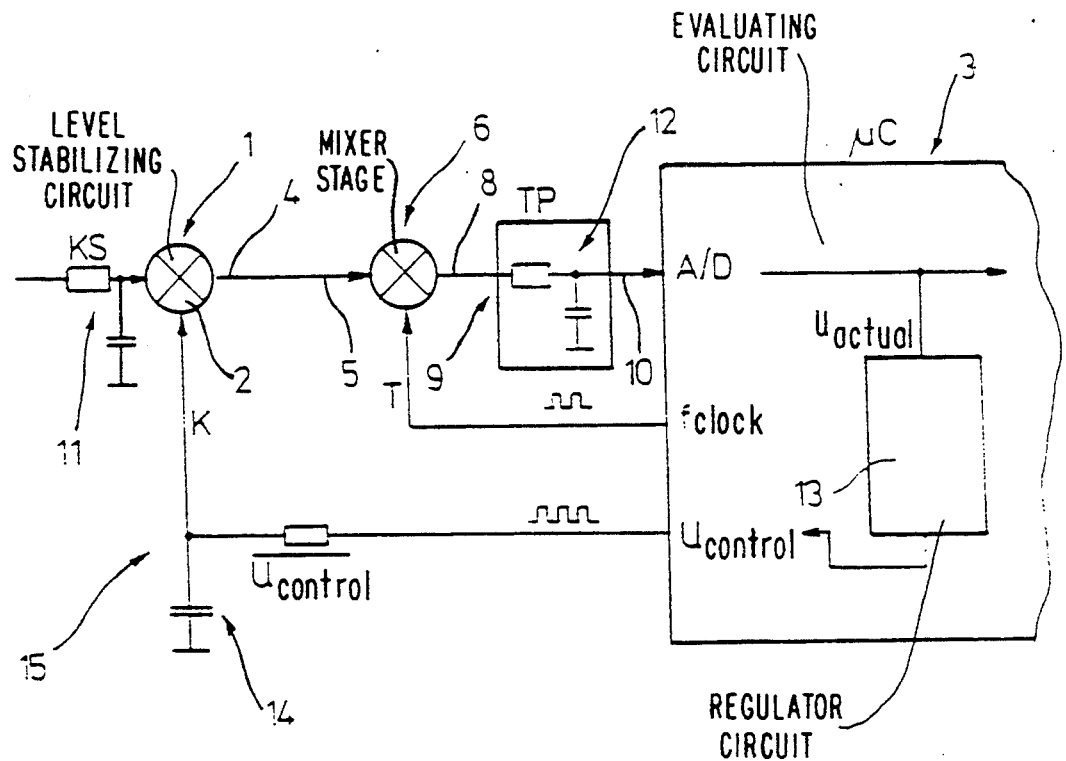
FIG. 2 shows the circuit arrangement of FIG. 1 in more detail.

FIG. 2 shows the circuit arrangement of FIG. 1 in a more detailed manner. It can be seen that the knock sensor signal KS is fed through a preliminary filter means comprising an RC network 11 to obtain a signal which is comparatively insensitive to interfering noise signals and oscillator harmonics from the mixer stage (secondary reception points). FIG. 2 shows further that the low-pass filter TP can be realized by means of an RC network 12. The evaluating circuit 3 is constructed as a microcomputer $\mu$C. For the purpose of generating the regulating signal K, the microcomputer has a regulator circuit 13 which receives an actual set value $u_{actual}$ as input quantity from the signal originating from the filter 9, which signal is fed to an analog/digital converter (A/D converter) of the microcomputer $\mu$C. A control voltage $U_{control}$ which is fed to an averaging element 14 constructed as an RC network 15 is available at the output of the regulator circuit 13. The mean value of the control voltage $U_{control}$ is the regulating signal.

The averaging element 14 is required, since the control voltage $U_{control}$ can only assume logical states. This is a matter of a square wave signal whose pulse width is modulated for the control function. The greater the pulse width, the higher the mean value at the averaging element 14 which is a direct voltage which is multiplied by the knock sensor signal KS at the stabilizer stage multiplier 2 in order to form an approximately constant level.

The oscillator frequency $f_{clock}$ is a square pulse train. This is likewise indicated in FIG. 2. This square pulse train leads to the aforementioned high-frequency mixing products which are, however, eliminated by the low-pass filter TP.

In the circuit arrangement of FIG. 2, a relatively large computing expenditure is required in the microcomputer $\mu$C, since all of the signal processing is effected in the latter. The A/D conversion time of the aforementioned analog/digital converter is to be selected so as to be small enough to fulfill the sampling theorem to a sufficient extent. This is carried out by commercially available A/D converters. The processing of the knock signal is effected by means of the software of the microcomputer $\mu$C (summing, integration through summation, evaluation, etc.).

The use of the aforementioned square wave signals can cause the aforementioned reception of higher harmonics from the mixer stage 6. This would not occur if a sine voltage were utilized as clock signal T. Of course, the low-pass filter TP prevents a negative effect of the aforementioned higher harmonics.

Commercially available operational transconductance amplifiers (OTA's), which can process knock signals of very high frequency, are preferably used as multipliers 2, 7.

Figure 3:
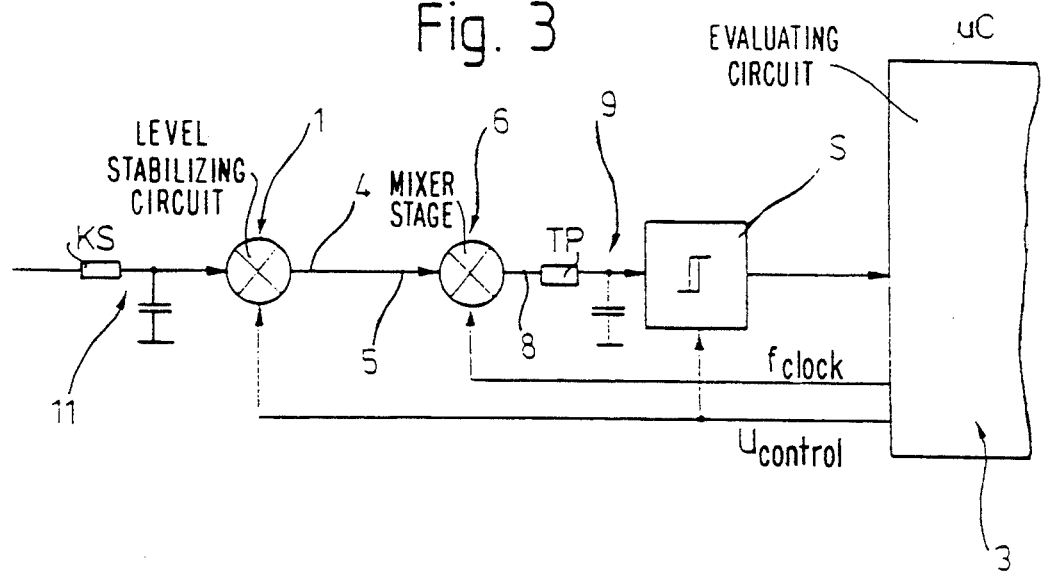
FIG. 3 shows another embodiment of the circuit arrangement.

FIG. 3 shows another embodiment example of the circuit arrangement, according to the invention, in which the microcomputer $\mu$C has less computing work to accomplish, since an evaluation of the knock sensor signal KS is effected partially with the use of hardware.

FIG. 3 differs from FIG. 1 substantially in that a threshold value switch S is connected between the low-pass filter TP and the microcomputer $\mu$C. This threshold value switch S detects when a normal level (set value) is exceeded and then triggers an interrupt. The threshold value switch S can have a hysteresis, as indicated in FIG. 3. The response level can be constant or—as shown in FIG. 3—can be influenced by the magnitude of the control voltage $U_{control}$. This circuit variant eliminates the need for the analog/digital converter of the microcomputer $\mu$C, since the decision about whether or not the level is exceeded, which implies a knocking, is made by the threshold value switch S. However, the exact knocking evaluation is carried out by the computer which determines the sum of the number of times the level is exceeded per unit of time and decides from this whether or not the internal combustion engine is knocking.

Figure 4:
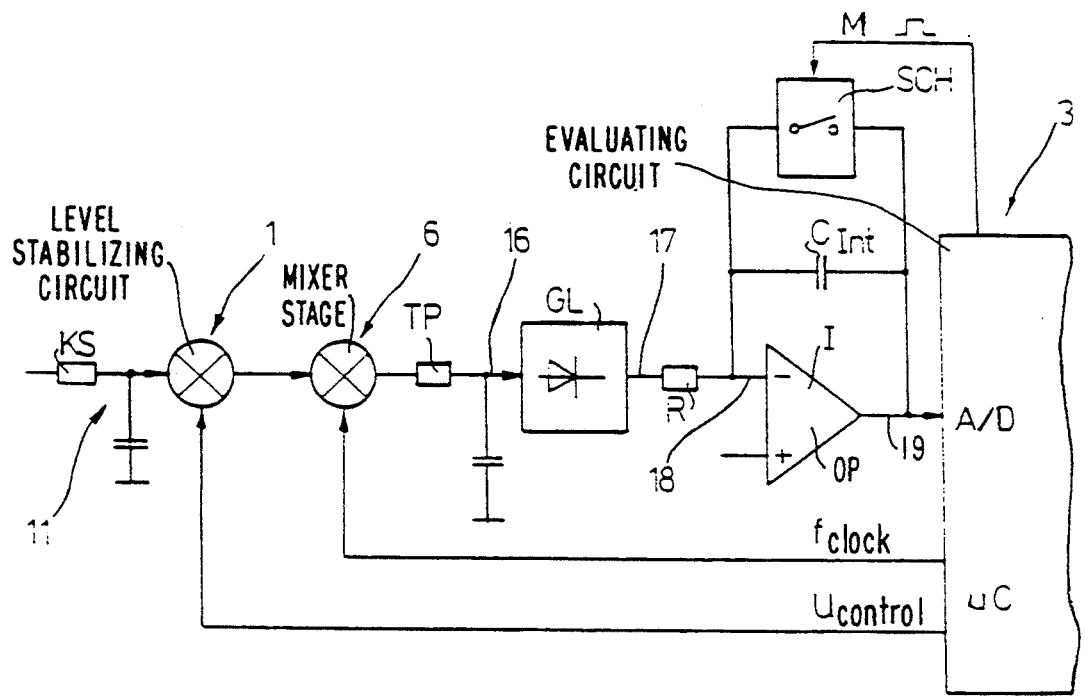
FIG. 4 shows still another embodiment of the circuit arrangement.

FIG. 4 shows another variant which requires less computing capacity. Instead of the threshold value switch S, a rectifier GL and integrator I are connected between the low-pass filter TP and the microcomputer $\mu$C. In particular, the rectifier GL is an envelope curve detector, whose input 16 is connected to the low-pass filter TP. The output 17 of the rectifier GL is connected to the negative input 18 of an operational amplifier OP via a resistor R. An integrating capacitor $C_{Int}$ leads from the negative input 18 to the output 19 of the operational amplifier OP. A switch SCH which is switched by a measuring window MF of the microcomputer $\mu$C lies parallel to the integrating capacitor $C_{int}$. Accordingly, it is ensured that the integration always only takes place immediately after ignition of the internal combustion engine.

Accordingly, the signal processing is effected to a great extent in the circuit arrangement according to FIG. 3 with the use of hardware. The microcomputer μC need only decide whether or not the integration value at the output 19 exceeds a set value, so that a conclusion can be reached as to whether or not there is knocking in the internal combustion engine. Consequently, the operation of the microcomputer μC is comparable to that of a comparator in this respect.

The knock vibrations to be detected occur as a result of cavity resonances in the residual volume of the corresponding cylinder of the internal combustion engine. In this instance, residual volume is understood to mean the volume present in the top dead center position. For such cavity vibrations, the solution to the respective wave equation is a group of solutions, that is, waves whose half and odd-number multiples of the half wavelength "fit into" the aforementioned cavity, for example, can also resonate. It would be conceivable to convert these harmonic oscillations into the audio range by means of a suitable clock signal containing harmonic waves so as to further improve the signal-to-noise ratio.

The advantages of the invention are based on the use of commercially available OTA's as multipliers 2 and 7. A simple low-pass filter TP of the first order, instead of the band-pass filter (knock filter) previously utilized in the prior art, is sufficient due to the convoluting or mixing with the other signal from the mixer stage of the knock signal in the frequency range. The circuit can be applied in a simple manner. The filter parameters of the low-pass filter TP and oscillator frequency $f_{clock}$ can be adjusted independently and without feedback. Due to the low processing frequency, the signal processing can be carried out in the microcomputer μC to a great extent without requiring a particularly great computing expenditure. As has already been mentioned, there is also the possibility of determining the harmonic waves of the knock signal as an additional source of information.

It is also possible, in principle, to replace the mixer stage multiplier 7 and the stabilizer stage multiplier 2 with a single multiplier. The circuit expenditure is accordingly further reduced.

Figure 5:
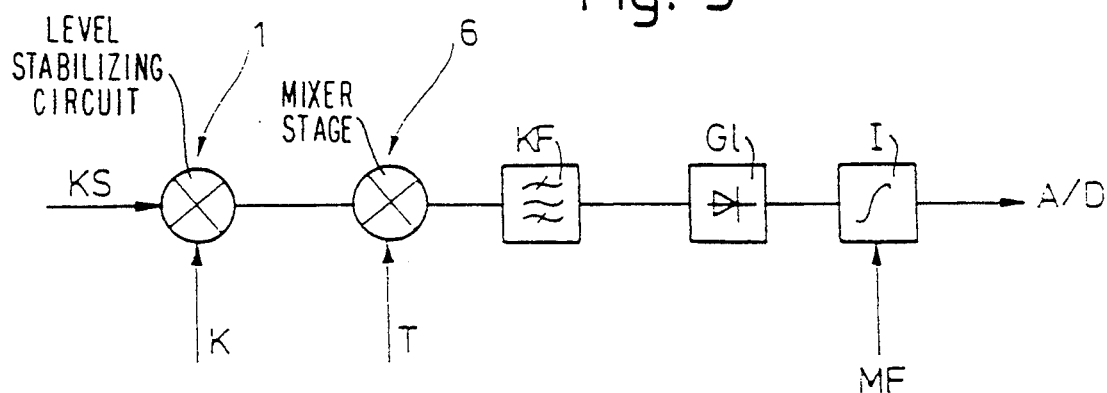
FIG. 5 shows still another embodiment of the circuit arrangement.

The embodiment of FIG. 5 differs from the previous embodiments in that an oscillator frequency $f_{clock}$ is selected for the clock signal T which does not conform to the frequency of the anticipated knock signal. Rather, a reduction of the relatively high frequency of the knock sensor signal KS to a lower frequency which can then be further processed using simple means is effected according to the superheterodyne principle. For the rest, the construction of the arrangement of FIG. 5 corresponds to the embodiment example of FIG. 4, wherein instead of the low-pass filter TP—as was conventional in the prior art—a knock filter KF, i.e. a band-pass filter, is used. The frequency of the clock signal T fed to the mixer stage can be below or above the frequency of the anticipated knock signal by an amount corresponding to the desired knock filter frequency (knock filter KF). The advantage of this signal processing consists—as was already mentioned—in that knock signals of very high frequency can be processed, wherein the additional signal processing makes no special demands with respect to speed (slew rate of the component elements).

Figure 6:
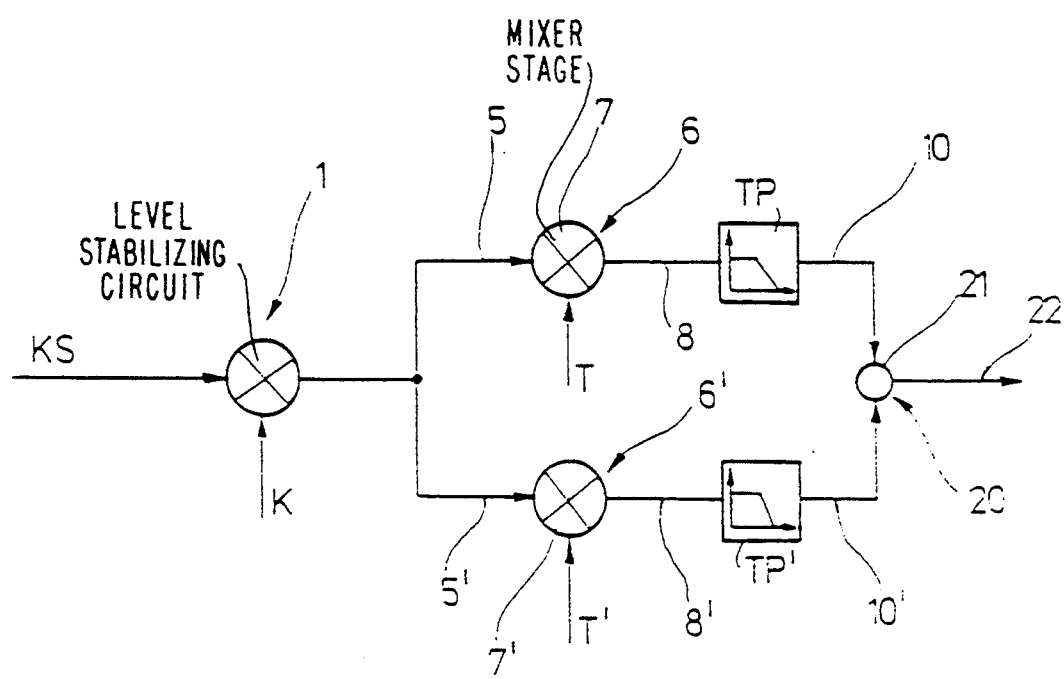
FIG. 6 shows still another embodiment of the circuit arrangement.

Another embodiment example which is shown in FIG. 6 has two mixer stages 6 and 6' instead of one mixer stage. The inputs 5 and 5' of these mixer stages 6 and 6', which are likewise constructed as multipliers 7 and 7', are both connected to the output 4 of the level stabilizing circuit 1. The clock signal T is fed to the multiplier 7 and a clock signal T' is fed to the multiplier 7', wherein the phase relation of these two clock signals T, T' differs by 90°. The following relationship applies to the clock signal T:

$$\hat{U} \sin(2\pi f_K t).$$

The following relationship applies to clock signal T':

$$\hat{U} \sin\left(2\pi f_K + \frac{\pi}{2}\right) t$$

wherein $f_K$ is the knock frequency. The outputs 8 and 8' of the multipliers 7 and 7' lead to a low-pass filter TP and TP', respectively, whose outputs 10 and 10' are connected to a combinatorial circuit 20. The combinatorial circuit 20 is preferably constructed as a summing or connection point 21. The output 22 is then fed to the evaluating circuit 3 in the conventional manner.

The arrangement in FIG. 6 ensures that the absence of synchronism between the clock signal and the knock signal does not render it impossible to evaluate knocking. As a result of this absence of synchronism in the evaluation of knocking it can come about that additional beat frequencies occur rather than the envelope curve being present alone. Accordingly, no distortion-free demodulation occurs; but this is unimportant, since the information concerning a knocking combustion consists in the exceeding of a determined amplitude value assigned to the normal ground noises. Such increases in amplitude can also be detected in the presence of beat frequencies. However, the beating can also lead to an output value of "zero" at least periodically. In this case, no knock sensing can be carried out. The circuit arrangement of FIG. 6 prevents such a situation, i.e. the aforementioned special case where the product is "zero" does not occur when two signals are multiplied. The two multipliers 7 and 7', which are operated with two oscillator frequencies $f_{clock}$, $f'_{clock}$ which are out of phase by 90° are used for this purpose. This involves so-called quadrature modulation.

Figure 7:
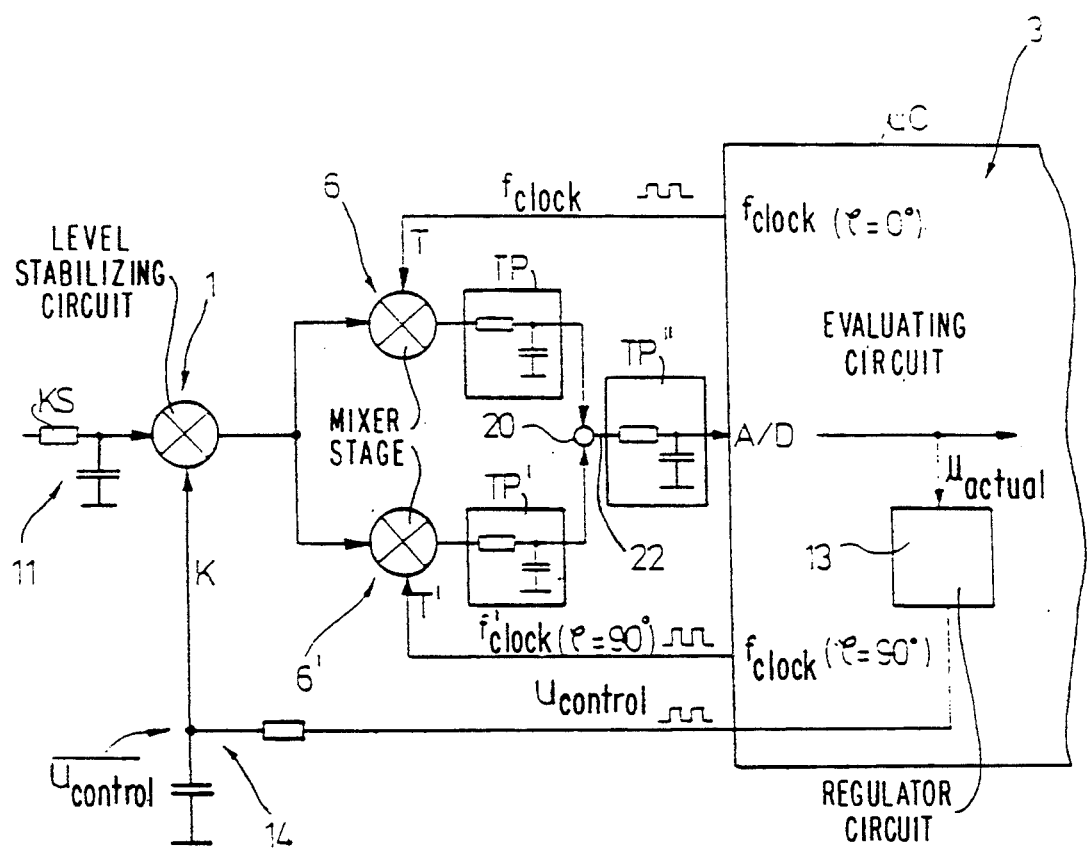
FIG. 7 shows still another embodiment of the circuit arrangement.

FIG. 7 shows an entire circuit similar to FIG. 2 whose structure is outlined in is taken into account. In an unshown alternative the two low-pass filters TP and TP' can be replaced by a low-pass filter TP'' which is connected to the output 22 of the combinatorial circuit 20 and is connected with the microcomputer μC by its output 10''.

Figure 8:
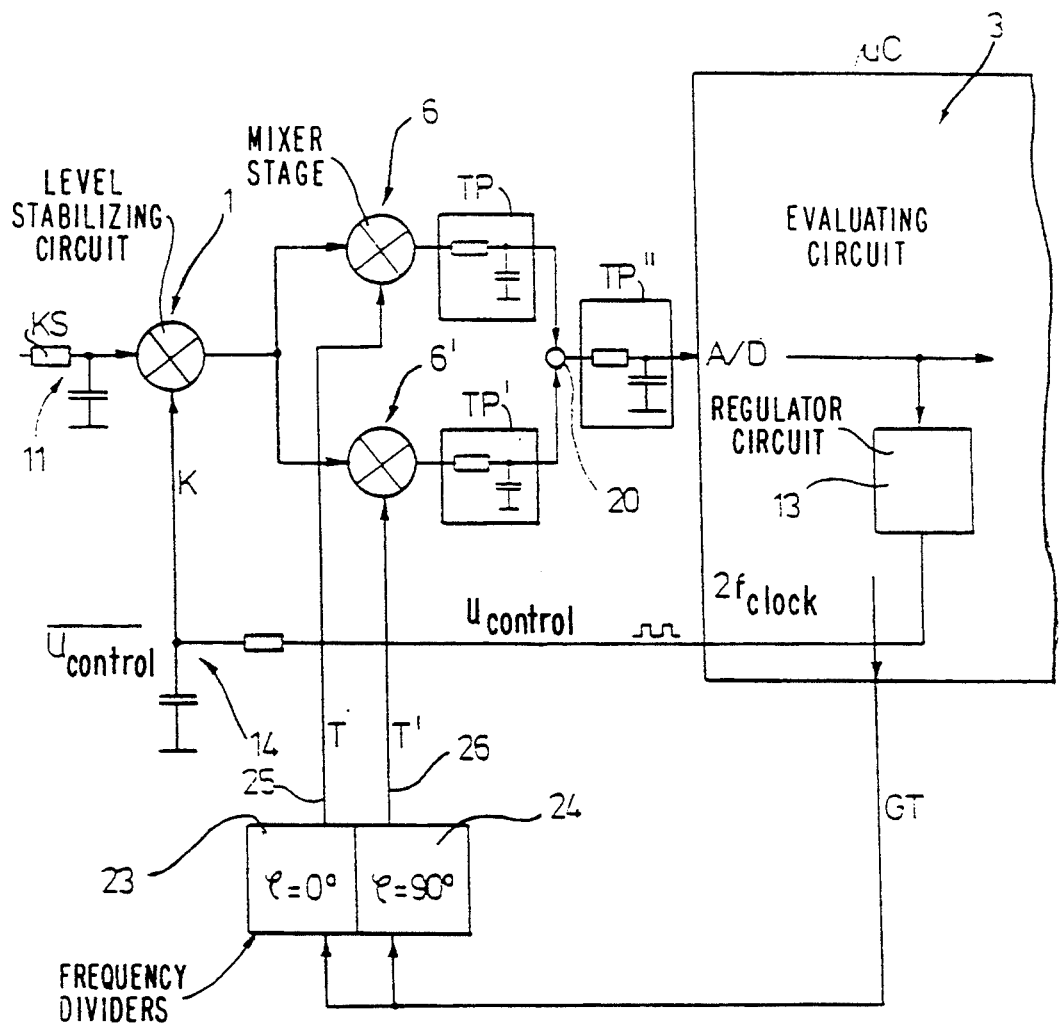
FIG. 8 shows still another embodiment of the circuit arrangement.

As has already been mentioned, it is necessary to use two clock signals T, T' which are out of phase by 90° relative to one another in order to avoid beating which can lead to an output signal with the value "zero". FIG. 8 shows a preferred embodiment example for this case. It is possible in principle for the microcomputer μC to generate oscillator frequencies $f_{clock}$ and $f'_{clock}$ which are out of phase by 90° relative to one another. Alternatively, in the preferred embodiment example of FIG. 8, the microcomputer μC generates a time base clock signal GT which has twice the frequency of the clock signal T and T', respectively. Two frequency dividers 23 and 24 are provided, the base clock signal GT being fed to the latter as input signal. One frequency divider is triggered by the positive flank of the base clock signal GT, the other frequency divider is triggered by the negative flank of the base clock signal GT. As a result, clock signals T and T', which are out of phase by 90° relative to one another, are available at the outputs 25 and 26 of the frequency dividers 23 and 24. These clock signals T and T' are then fed to the multipliers 7 and 7' in a manner which has already been described. FIG. 8 shows two low-pass filters TP and TP'; however, as an alternative, it is also possible—as has already been mentioned—to provide only one low-pass filter TP" at the output of the combinatorial circuit 20 instead of the two low-pass filters TP, TP'.

The aforementioned 90° separation can be a component part of the microcomputer $\mu C$ in the integrated knock evaluation circuit; there is then no extra expenditure on peripherals.

Figure 9:
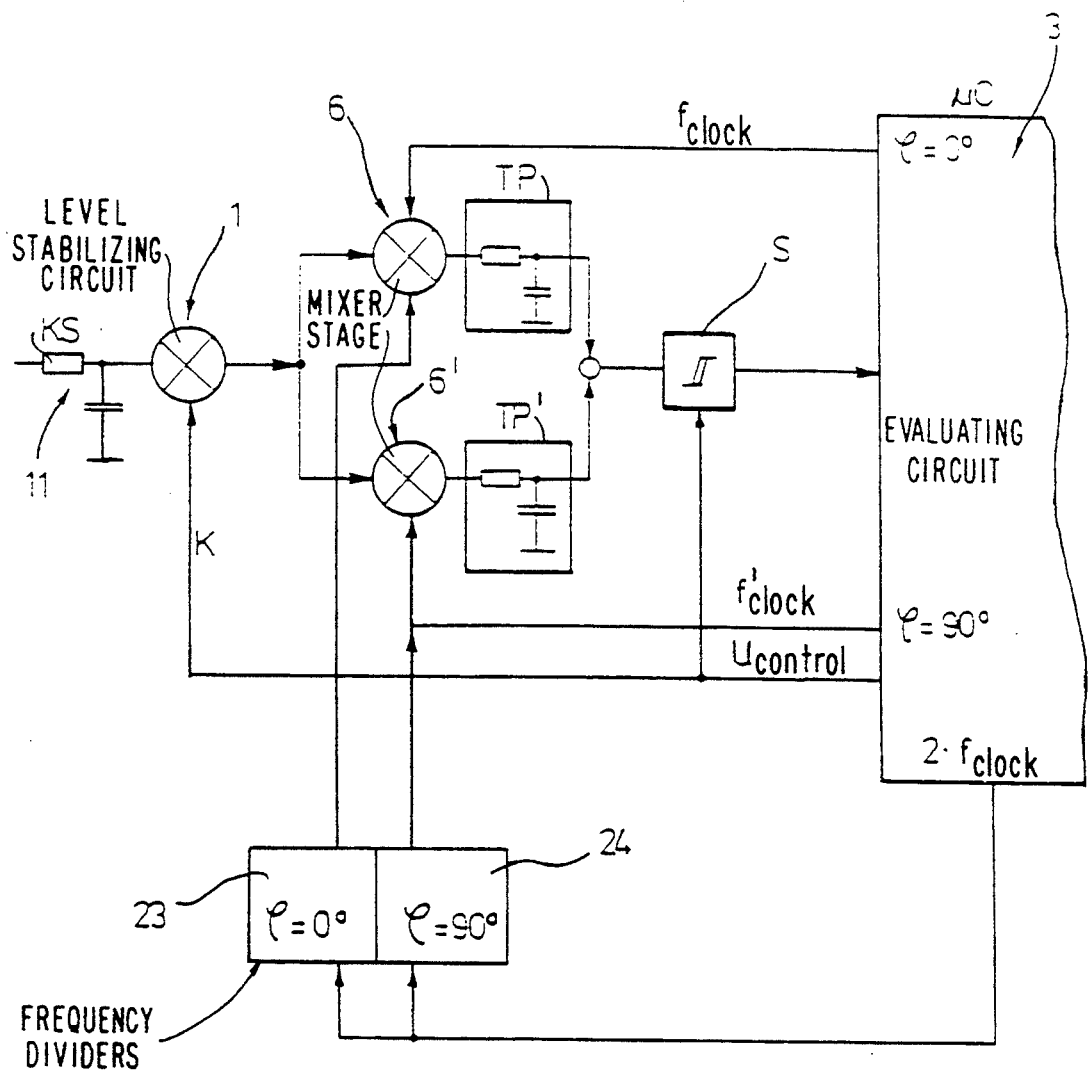
FIG. 9 shows still another embodiment of the circuit arrangement.

FIG. 9 shows an embodiment example in which a threshold value switch S is used—corresponding to the embodiment form of FIG. 3. The preceding statements can be referred to with respect to its further construction.

Figure 10:
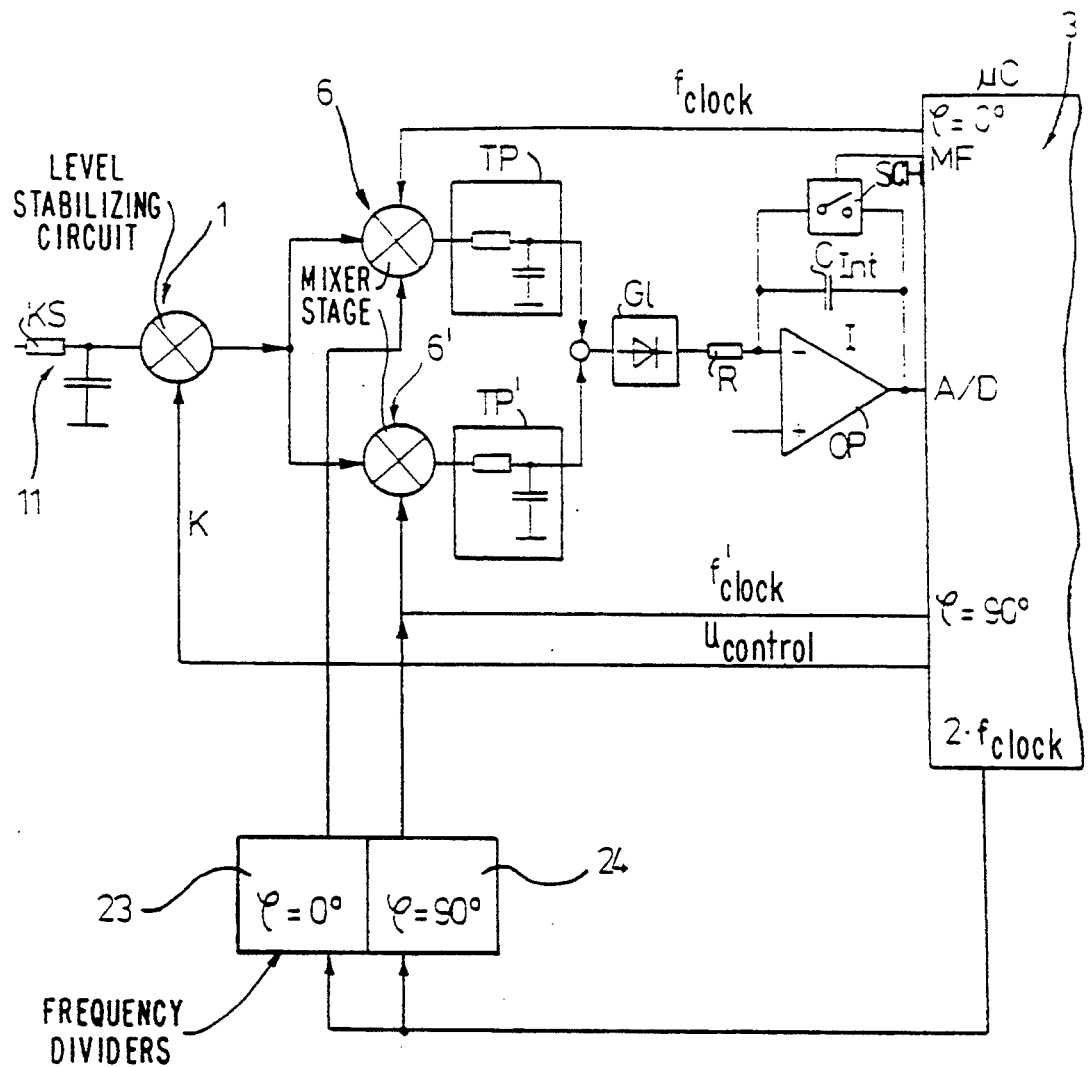
FIG. 10 shows still another embodiment of the circuit arrangement.

Finally, FIG. 10 concerns an embodiment form corresponding to that of FIG. 4; that is, a rectifier GL and an integrator I are provided.

While the invention has been illustrated and described as embodied in a circuit arrangement to detect and evaluate knocking in an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

I claim:

1. Circuit arrangement for detecting and evaluating knocking in an internal combustion engine, said circuit arrangement comprising a knock sensor located in said internal combustion engine to generate a knock sensor signal having a plurality of knock signal frequency components at plurality of knock signal frequencies when knocking is occurring; oscillator means for producing an oscillator signal having a constant frequency and means for superposing said oscillator signal and said knock sensor signal to produce a mixed signal including a plurality of mixed signal frequency components at mixed signal frequencies less than said knock signal frequencies; level stabilizing circuit means for adjusting said knock sensor signal to a constant amplitude level despite changes in an operating state of said internal combustion engine, said level stabilizing circuit means connecting said knock sensor and said means for superposing; filter means connected to said means for superposing to filter said mixed signal and to produce a filtered mixed signal including filtered mixed signal components at said mixed signal frequencies; and evaluating circuit means connected to said filter means for evaluating said filtered mixed signal.

2. Circuit arrangement as defined in claim 1, wherein said means for superposing comprises a mixer stage multiplier.

3. Circuit arrangement as defined in claim 2, wherein said level stabilizing circuit means comprises a stabilizer circuit multiplier and has an input for said knock sensor signal from said knock sensor and another input for a level signal varying according to an amplitude of said knock sensor signal from said knock sensor.

4. Circuit arrangement as defined in claim 3, further comprising a regulator circuit for generating said level signal, said regulator circuit being connected with said level stabilizing circuit means.

5. Circuit arrangement as defined in claim 4, wherein said evaluating circuit comprises a microcomputer including said regulator circuit.

6. Circuit arrangement as defined in claim 5, further comprising averaging means connecting said regulator circuit of said microcomputer with said level stabilizing circuit means.

7. Circuit arrangement as defined in claim 6, wherein said regulator circuit produces a pulse-width modulated output signal.

8. Circuit arrangement as defined in claim 7, wherein said pulse-width modulated output signal is a square-wave signal.

9. Circuit arrangement as defined in claim 6, wherein said averaging means comprises an RC circuit network.

10. Circuit arrangement as defined in claim 1, wherein said filter means comprises a low-pass filter.

11. Circuit arrangement as defined in claim 10, wherein said low-pass filter comprises an RC circuit network.

12. Circuit arrangement as defined in claim 1, wherein said means for superposing includes two mixer stage multipliers, said level stabilizing circuit means is connected between said knock sensor and each of said two mixer stage multipliers, and said mixer stage multipliers are operational transconductance amplifiers.

13. Circuit arrangement as defined in claim 1, and further comprising another oscillator means for producing another oscillator signal having another constant frequency and another means for superposing connected to said knock sensor, said other means for superposing receiving said other oscillator signal for superposing with said knock sensor signal to form another mixed signal including a plurality of other mixed frequency components having mixed signal frequencies less than said knock signal frequencies, said constant frequencies of both of said oscillator means being equal and said oscillator signals of said oscillator means having different phase relationships.

14. Circuit arrangement as defined in claim 13, wherein said oscillator signal is out of phase with said other oscillator signal by 90°.

15. Circuit arrangement as defined in claim 13, wherein said mixed signal is out of phase with said other mixed signal by 90°.

16. Circuit arrangement as defined in claim 15, further comprising a microcomputer having clock signal generating means for generating said oscillator signals.

17. Circuit arrangement as defined in claim 16, wherein said clock signal generating means includes a time base clock signal generator and two frequency divider means connected to each of said means for superposing, each of said frequency dividers being connected to said time base clock signal generator, and said time base clock signal generator contains means for generating a time base clock signal at a constant time base clock frequency, and one of said frequency divider means is connected to one of said means for superposing and another of said frequency divider means is connected to another of said means for superposing to provide respective ones of said oscillator signals to each of said means for superposing 90° out of phase with each other and so that said constant frequencies are equal.

18. Circuit arrangement as defined in claim 12, wherein said filter means comprises two low-pass filters having filter outputs, each of said mixer stage multipliers having an output connected to a respective one of said low-pass filters; and further comprising a combinatorial circuit connected to said filter outputs.

19. Circuit arrangement as defined in claim 18, wherein said combinatorial circuit comprises a connection point connected with said filter outputs and with said evaluating circuit means.

20. Circuit arrangement as defined in claim 1, further comprising a threshold value switch connected between said filter means and said evaluating circuit.

21. Circuit arrangement as defined in claim 1, and further comprising a rectifier and an integrator connected between said filter means and said evaluating circuit.

* * * * *